United States Patent [19]

Blatner

[11] Patent Number: 4,577,652

[45] Date of Patent: Mar. 25, 1986

[54] NOZZLE AND IMPINGEMENT PLATE VALVE

[75] Inventor: John R. Blatner, Amherst, N.Y.

[73] Assignee: Hydraulic Servocontrols Corporation, Buffalo, N.Y.

[21] Appl. No.: 587,607

[22] Filed: Mar. 8, 1984

[51] Int. Cl.[4] .............................................. G05D 16/00

[52] U.S. Cl. ................................ 137/82; 137/625.28; 251/129.01

[58] Field of Search ........................ 137/82, 83, 85, 84; 251/129; 137/625.28

[56] References Cited

U.S. PATENT DOCUMENTS

| | | | |
|---|---|---|---|
| 2,692,498 | 10/1954 | Knobel | 73/37.5 |
| 3,010,309 | 11/1961 | Lee | 73/37.9 |
| 3,127,764 | 4/1964 | Hudson | 73/37.5 |
| 3,371,517 | 3/1968 | Roth | 73/37.5 |
| 3,517,545 | 6/1970 | Ogren | 73/37.5 |
| 3,545,256 | 12/1970 | Beeken | 73/37.5 |
| 3,621,859 | 11/1971 | Scott | 137/81.5 |
| 3,792,605 | 2/1974 | Rabenau | 73/37.9 |
| 3,794,058 | 2/1974 | Riley | 137/82 |
| 3,826,487 | 7/1974 | Forster et al. | 271/263 |
| 3,833,017 | 9/1974 | Gordon | 137/83 X |
| 3,894,552 | 7/1975 | Bowditch | 137/82 |

*Primary Examiner*—Alan Cohan

*Attorney, Agent, or Firm*—Joseph P. Gastel

[57] ABSTRACT

A valve construction including an impingement plate and a nozzle structure mounted for relative movement therebetween, a first conduit for conducting fluid to the nozzle structure, the nozzle structure consisting of a plurality of cylindrical nozzles at the end of the conduit proximate the plate for projecting fluid from the conduit onto the plate or into the conduit (for reverse flow applications), the plurality of cylindrical nozzles providing a greater ratio of total metering area to projected nozzle area than is obtained by a single cylindrical nozzle. As an alternate to the plurality of cylindrical nozzles, a shaped noncylindrical nozzle may be used which has a higher ratio of metering area to projected area than that of a single cylindrical nozzle.

5 Claims, 15 Drawing Figures

Fig. 4.
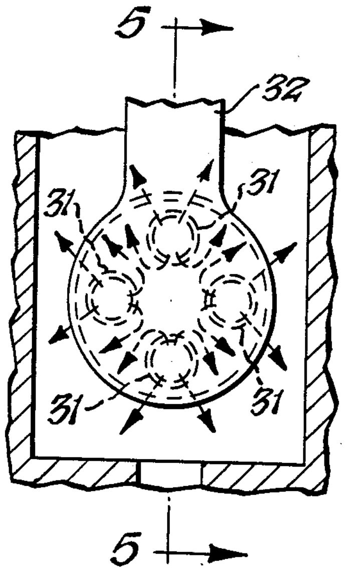
Fig. 5.
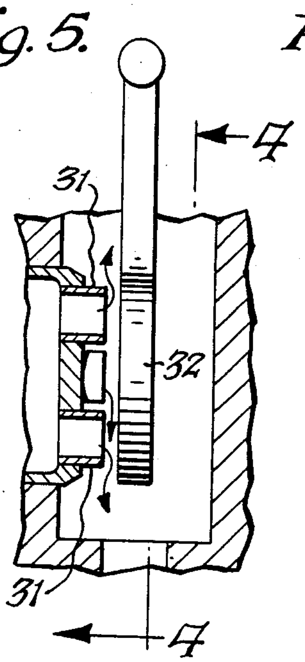
Fig. 8.
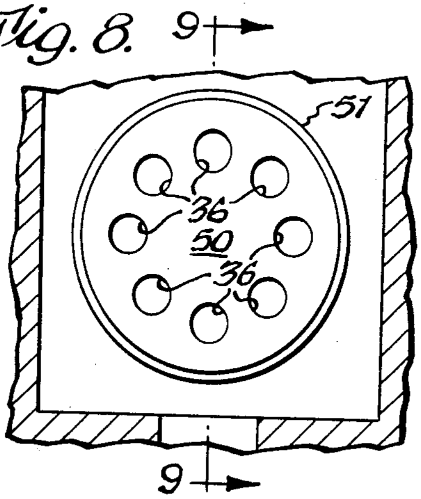
Fig. 9.
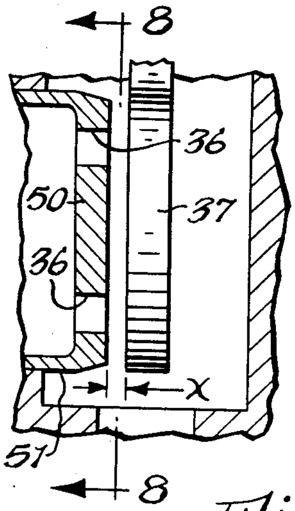
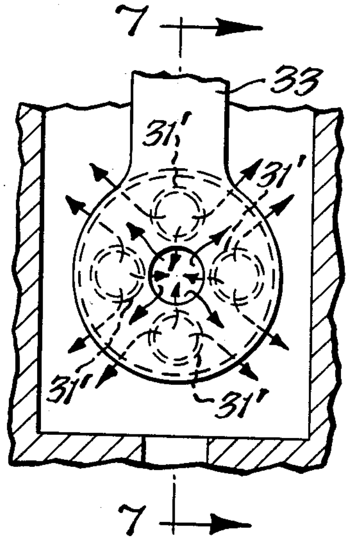
Fig. 6.
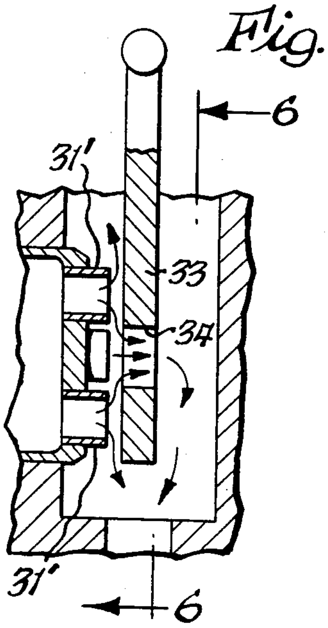
Fig. 7.
Fig. 10.
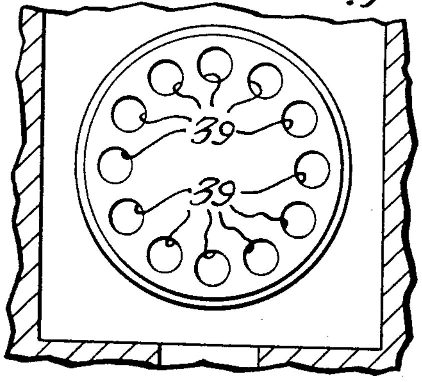
Fig. 11
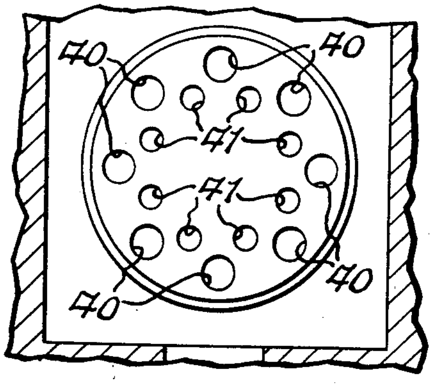

NOZZLE AND IMPINGEMENT PLATE VALVE

BACKGROUND OF THE INVENTION

The present invention relates to improved valve constructions of the nozzle and impingement plate type.

By way of background, in a nozzle and impingement plate type valve, flow through the valve is controlled by varying the gap between the impingement plate and the tip of the nozzle. In many valves the gap dimension is quite small in relation to the diameter of the nozzle. This is particularly the case for servovalves that are controlled by torque motors which inherently have small angular impingement plate or flapper displacement capability. The fluid metering area in such valves (sometimes referred to as curtain area) is the product of the flow periphery times the nozzle gap. Another significant parameter in such valves is the force required to position the flapper or nozzle in relationship to each other, i.e., to vary the nozzle gap. This force may be expressed as the product of the projected nozzle area (on the flapper) times the pressure drop across the nozzle-impingement plate interface. Thus, for a valve with a given nozzle gap and pressure drop, the flow will increase linearly with nozzle diameter while the operating force increases as the square of the nozzle diameter. It is generally desirable for a valve to have a high ratio of total metering area to projected nozzle area.

SUMMARY OF THE INVENTION

It is accordingly one object of the present invention to provide an improved nozzle and impingement plate type of valve having a nozzle construction which will give a relatively high ratio of metering area to projected nozzle area so as to permit the use of actuation devices having smaller force output and therefore smaller size and weight and, in the case of torque-motor operated valves, lower electrical power requirements.

Another object of the present invention is to provide an improved servovalve having a nozzle and impingement plate type of valve in which the ratio of metering area to projected nozzle area can be increased by utilizing a plurality of cylindrical nozzles, rather than a single cylindrical nozzle, or by utilizing nozzles having shapes other than cylindrical. Other objects and attendant advantages of the present invention will readily be perceived hereafter.

The present invention relates to a nozzle and impingement plate valve comprising conduit means for conducting fluid, nozzle means in communication with said conduit means to receive fluid therefrom, said nozzle means being of completely continuous cross sectional area within its outer peripheral border and having a higher ratio of flow area to projected area than that of a single cylindrical nozzle, and an impingement plate proximate said nozzle means onto which said nozzle means project fluid. The various aspects of the present invention will be more fully understood when the following portions of the specification are read in conjunction with the accompanying drawings wherein:

BRIEF DESCRIPTION OF THE DRAWINGS

FIG. 4 is a fragmentary end elevational view of another embodiment of the present invention utilizing four nozzles and taken substantially along line 4—4 of FIG. 5;

FIG. 5 is a fragmentary cross sectional view taken substantially along line 5—5 of FIG. 4;

FIG. 6 is a fragmentary cross sectional view of still another embodiment of the present invention taken substantially along line 6—6 of FIG. 7;

FIG. 7 is a fragmentary cross sectional view taken substantially along line 7—7 of FIG. 6;

FIG. 8 is a fragmentary end elevational view, partially in cross section, of another embodiment of the present invention taken substantially along line 8—8 of FIG. 9;

FIG. 9 is a fragmentary cross sectional view taken substantially along line 9—9 of FIG. 8;

FIG. 10 is a fragmentary end elevational view similar to FIG. 8 and showing another nozzle configuration embodiment;

FIG. 11 is a view similar to FIG. 8 and showing still another nozzle configuration embodiment;

DESCRIPTION OF THE PREFERRED EMBODIMENTS

By way of introduction, while certain portions of the following description will refer to a servovalave, and more particularly to the nozzle and flapper thereof, it will be appreciated that the present invention relates broadly to an improved nozzle and impingement plate type of valve. In valves of this type the impingement plate can be of any type whatsoever for the purpose of controlling fluid flow through the nozzle or being controlled by fluid flowing through the nozzle. Furthermore, in valves of this type there is relative movement between the nozzle and the impingement plate, with such relative movement being due to sole movement of the impingement plate, or sole movement of the nozzle, or movement of both. As is well understood, nozzle and impingement valves of the present type are used to control flow or pressure or both. It is to be expressly understood that while portions of the following description refer to a servovalve, the present invention is not limited thereto but is directed broadly to the nozzle and impingement plate type of valve. Furthermore, while the specific actuation structure is shown as being an electrically-operated torque motor associated with the flapper of a servovalve, it will be appreciated that different actuation devices may be employed for changing the gap between the nozzle and impingement plate, and such actuation devices may include, without limitation, fluid actuation diaphragms, springs, and other types of mechanical, electrical and fluid pressure devices.

It has been found, in accordance with the present invention, that if a single nozzle is divided into a plurality of smaller nozzles, the ratio of metering area to projected nozzle area can be increased, to thereby reduce the operating force, which, in turn, will require a less forceful actuating device. As an example, assume a single nozzle valve having a cylindrical nozzle with a diameter Dn and a nozzle gap x. For the same pressure drop and nozzle gap, this valve configuration will be compared to one having two nozzles each with a diameter of Dn/2. The dual nozzle valve has the same flow metering area as the single nozzle valve, but it has one-half of the projected area and consequently one-half the pressure drop induced force. The benefits of the foregoing multiple nozzle concept can be extended further as the number of nozzles is increased above two, in that there will be a reduced operating force which permits a given valve requirement to be met with a less forceful torque motor or other actuation device than would be required for a single nozzle type of valve. In the case of valves controlled by a torque motor, this allows operation with a motor of smaller size, weight and electrical power requirements.

Figure 1:
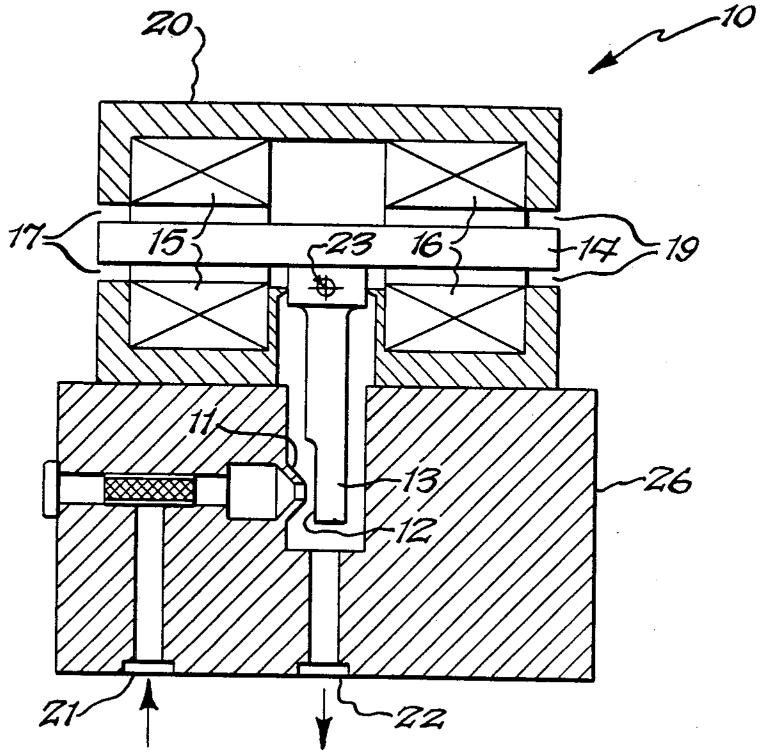
Fig. 1 PRIOR ART
FIG. 1 is a schematic representation of a prior art nozzle and impingement plate valve associated with a two-way single-stage servovalve wherein the nozzle and flapper-type of the impingement plate are used to control flow through the servovalve.

Solely by way of example to show one possible environment for the improved valve, FIG. 1 depicts a system schematic for a typical prior art servovalve 10 having a cylindrical nozzle 11 which projects fluid onto the face 12 of an impingement plate in the form of a flapper 13 which is rigidly connected to an armature 14 positioned through the center of coils 15 and 16 which in turn act to control magnetic flux in the gaps 17 and 19 associated with frame-magnet 20. Fluid flow through the servovalve is through pressure inlet conduit 21 and out return conduit 22, both being located in valve housing 26. The nozzle 11 and impingement plate or flapper 13 are used to control the flow through the servovalve. The flow is controlled by adjusting the flow area known as the curtain area or metering area to be described hereafter. Magnetic flux paths exist in the two sets of air gaps 17 and 19 at all times. When the armature is in mid-position with no signal to the coils, the flux levels in the four gaps are balanced and equal and no flux exists through the length of the armature. When coils 15 and 16 are energized, on electromagnetic difference in potential is developed between the ends of the armature which in turn unbalances the flux distribution in the air gaps in a manner that may cause, for example, a force to act in the upward direction on the right end of armature 14 and in the downward direction on the left end. These forces translate to a torque about pivot point 23 that is transmitted to the flapper end which provides the variable curtain area. The foregoing operation can be used to control flow, pressure drop or a combination of both depending on the specific requirement. All of the foregoing is conventional in the art, and is being set forth to depict a specific device in which the improved nozzle and impingement plate type of valve can be used, it being appreciated that it can be used in other devices, as enumerated above.

Figure 2:
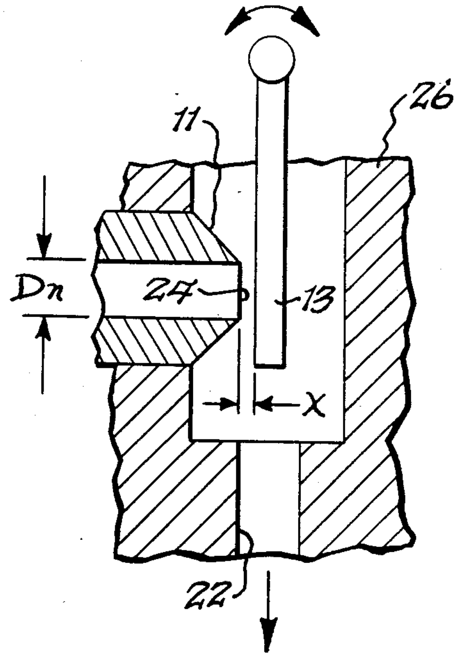
Fig. 2. PRIOR ART
FIG. 2 is a fragmentary enlarged cross sectional view of a conventional nozzle and impingement plate valve used in a servovalve of the type shown in FIG. 1.

By way of further background, FIG. 2 shows a typical arrangement of the conventional nozzle and impingement plate type of valve which employs an impingement plate or flapper 13 which is positioned to open or close the exit opening 24 of a cylindrical nozzle 11 through which fluid is flowing. In this instance, the nozzle and flapper may be mounted in a servovalve housing 26. The gap x between the impingement plate 13 and the end of the nozzle opening 24 is quite small in relation to the diameter Dn of the nozzle. This is particularly the case for servovalves which are controlled by torque motors which inherently have small angular displacement capability. In some cases the flapper-nozzle type valves of FIG. 2 are used to control relatively high flow rates and pressure drops. Such applications include metering of fuel flow on gas turbine engines and pressure control in various systems where it is advantageous to use a single stage type servovalve in lieu of a two-stage valve for reasons of cost and reliability.

In the foregoing type of applications, where a conventional cylindrical nozzle 11 is used, the flow and pressure drop specifications can require a relatively large diameter nozzle, high flapper displacement, and high operating force. These parameters dictate the size, weight and electrical power characteristics of the torque motor. In aerospace applications, all of these factors tend to be critical in varying degrees.

In accordance with the present invention, the improved nozzle configuration of FIGS. 3–15, provide more efficient control of flow and pressure. Thus, a given flow and pressure drop can be controlled by a flapper or impingement plate having a lower force and displacement capability, thus utilizing a smaller torque motor. Essentially the underlying concept of the present invention is the use of a multiplicity of cylindrical nozzles with the flow therefrom impinging upon a common impingement plate, or a specially shaped nozzle which has a large periphery in relation to the projected nozzle area.

Figure 3:
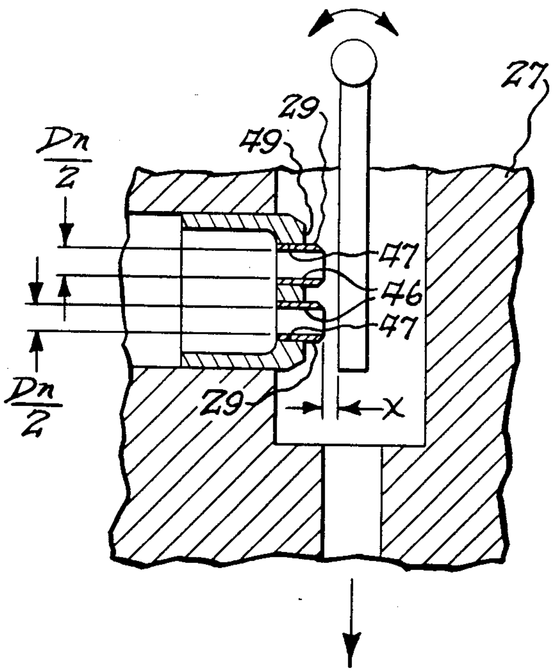
FIG. 3 is a fragmentary cross sectional view similar to FIG. 2 showing one embodiment of the improved nozzle and impingement plate construction of the present invention.
Figure 13:
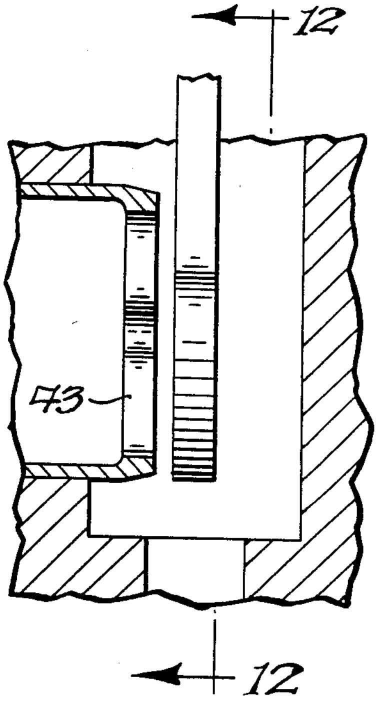
FIG. 13 is a fragmentary cross sectional view taken substantially along line 13—13 of FIG. 12.
Figure 12:
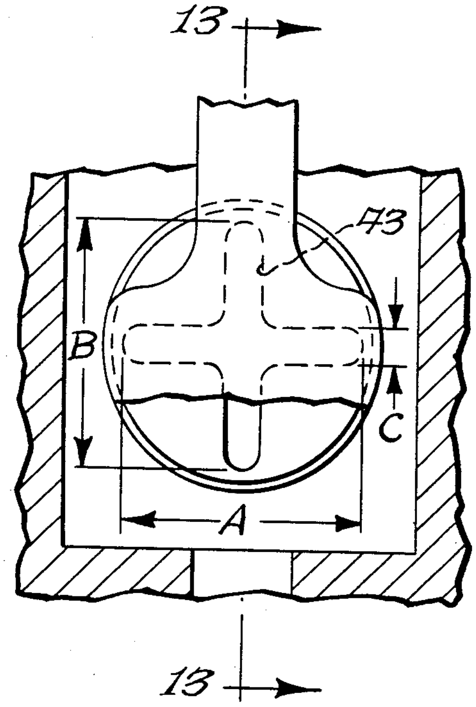
FIG. 12 is a fragmentary cross sectional view, partially broken away, taken substantially along line 12—12 of FIG. 13 and showing another nozzle configuration embodiment.

One embodiment of the present invention is shown in FIG. 3. The operating principle of the improved nozzle and impingement plate valve 27 of FIG. 3 can best be understood when it is compared by analysis to the conventional nozzle and impingement plate valve of FIG. 2. In FIG. 2 the metering area or curtain area will be $Dn\pi x$, where x is the gap between the nozzle and the impingement plate. The fluid pressure force on the face of flapper 13 will be the projected nozzle area multiplied by the pressure drop $\Delta P$ across the nozzle, or $\pi(Dn^2/4)\Delta P$. However, referring to FIG. 3, each of the nozzles 29 shown are, for example, one-half the diameter Dn of the nozzle 11 in FIG. 2 or Dn/2. The total metering area of the nozzle of FIG. 3 would therefore be the same as that of FIG. 2, namely, $2(Dn/2)\pi x$ or $Dn\pi x$ at the same impingement plate displacement x. However, the total projected nozzle area for the nozzle arrangement of FIG. 3 would be half that for the nozzle of FIG. 2, and the impingement plate force would be correspondingly reduced. In other words, the projected nozzle area in FIG. 3 would be $2\pi(Dn/2)^2/4$ or $\frac{1}{2}\pi(Dn^2/4)$, and the fluid pressure force on the an impingement plate will be $\frac{1}{2}\pi(Dn^2/4)\Delta P$. Thus, the embodiment of FIG. 2 requires an impingement plate force of one half of that required by the embodiment of FIG. 2 for the same metering area, and thus, as expressed above, a given flow and pressure drop can be controlled by an impingement plate having a lower force capability, thus utilizing a smaller torque motor or other type of actuating device.

In FIGS. 4–15, the benefits of the multiple nozzle concept of FIG. 3 are extended further as the number of nozzles is increased above two. However, several limiting factors must be considered in determining the optimum number of nozzles for a given application. As the nozzle cross section area begins to approach the peripheral metering area, the flow restriction becomes that of two orifices in series and the metering efficiency of the nozzle configuration is accordingly reduced. Another consideration is to provide spacing between the nozzles so that there are suitable passages for the flow that is issuing from the inside edges of a circular group of nozzles to pass radially outward to the exit chamber. The actual flow characteristics of any given nozzle arrangement will generally be determined by testing the valve configuration including the exit cavity and passaging in the valve housing.

FIGS. 4 and 5 are views of a valve construction having four nozzles 31 impinging on an impingement plate 32 of the configuration shown. The arrows in FIGS. 4 and 5 depict the flow paths of the fluid which would exist with this nozzle arrangement.

In FIGS. 6 and 7 a further modified embodiment of the present invention is disclosed wherein four nozzles 31' are utilized and thus the nozzle construction is the same as described above relative to FIGS. 4 and 5. However, the impingement plate 33 of FIGS. 6 and 7 has a central hole 34 between all the nozzles so that fluid flow can be in the direction of the arrows. It will be appreciated that other embodiments of the present invention can utilize a hole or a plurality of holes in the impingement plate to produce the desired fluid flow paths.

In FIGS. 8 and 9 still another embodiment of the present invention is disclosed wherein eight nozzles 36 project fluid onto impingement plate 37.

In FIG. 10 still another embodiment of the present invention is disclosed wherein twelve cylindrical nozzles 39 are used.

In FIG. 11 a further embodiment of the present invention is disclosed wherein a plurality of nozzles 40, in this instance eight, are used in conjunction with a plurality of nozzles 41 which also number eight.

The use of combinations of different sizes nozzles permits optimum flow path arrangements where a large number of nozzles are required.

While the foregoing descriptions refer to the more common arrangement with fluid flow emitting from nozzles against an impringement plate, it will be recognized that the present invention may also be used for valves where flow is in the opposite direction, i.e., from the chamber surrounding the plate, past the metering edges and into the multiple nozzle passages. For this configuration the force due to the pressure drop across the projected areas acts in the direction to tend to close off the nozzle openings. The multiple nozzle concept permits such a valve to control a given flow with significantly lower flapper closing force than would be encountered with the equivalent single opening nozzle.

It will be appreciated that the nozzles need not be cylindrical, as indicated above relative to FIGS. 1-11, but they may take other shapes which will provide a high ratio of metering area to projected area. In this regard, in FIG. 12, nozzle 43 is of cruciform shape having a peripheral or metering area determined by the length of its border and a projected area as determined by the area of the cruciform within its border. It can readily be seen that the projected area is small in relationship to the peripheral area. Thus, the nozzle shape can be tailored to provide the desired ratio of peripheral or metering area to projected area so as to achieve the necessary objectives of obtaining the optimum parameters for a system, namely, the relatively small diameter nozzle and low operating forces.

Figure 15:
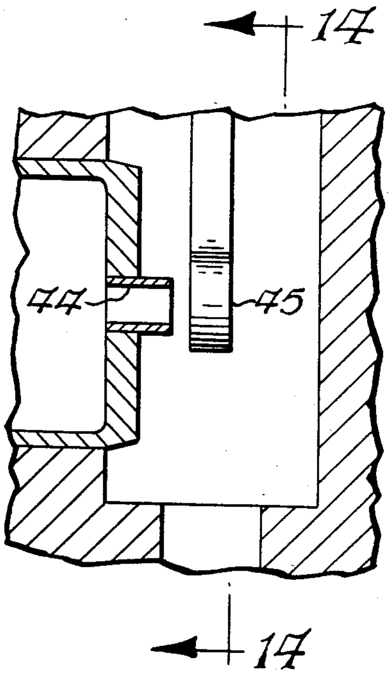
FIG. 15 is a fragmentary cross sectional view taken substantially along line 15—15 of FIG. 14.
Figure 14:
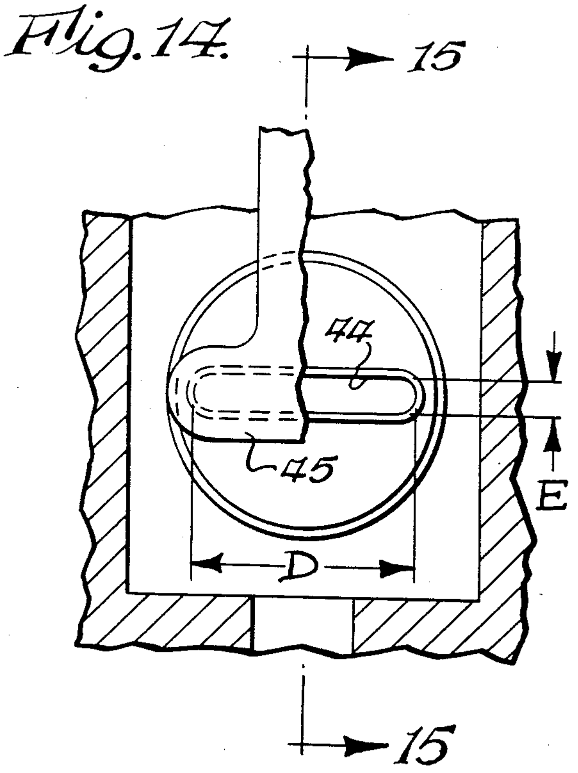
FIG. 14 is a fragmentary end elevational view, partially in cross section, taken subtantially along line 14—14 of FIG. 15 and showing still another nozzle and impingement plate configuration embodiment.

In FIGS. 14 and 15 another embodiment of the present invention is disclosed wherein the nozzle 44 has an oblong shape which includes a length D and a width E with semicircular ends. Again, this nozzle has a relatively high peripheral area as compared to its projected area. In this embodiment the impingement plate 45 has the side elevational shape shown in FIG. 14 which enhances the flow of fluid thereabout because it is essentially shaped like the shape of a nozzle.

One method of fabricating the nozzles of FIGS. 3, 4, 5, 6, 7, 14 and 15 is the insertion of tubes of the desired shape into openings in the main conduit. For example, in FIG. 2 short tubes 46 are inserted with a very tight fit in bores 47 and the joints therebetween are brazed or otherwise secured. By this procedure the ends of the nozzles 29 project outwardly from the face 49 of the conduit so that well defined fluid passages are produced. Another way of practicing the present invention is by making the nozzles in the manner shown in FIGS. 8, 9, 10, 11, 12 and 13, namely, by drilling bores in the end 50 of the fluid conduit 51, rather than inserting separate nozzles, such as 29, into the end of the conduit of FIG. 3. It will be recognized that many other types of nozzle-conduit constructions may be employed, e.g., electrical discharge machining, electrochemical milling, metal forming, powdered metal molding, etc. The parts also can be made of non-metallic materials.

In all of the embodiments of the present invention the nozzles have a complete and continuous cross-sectional area within their peripheral borders. In other words, for example, the cross-sectional areas of certain nozzles are circles because they have continuous cross-sectional areas, whereas if they did not have continuous cross-sectional areas as defined aove, the cross-sectional areas could be in the form of annuli.

It can thus be seen that the improved nozzle and impingement plate type of valve construction of the present invention is manifestly capable of achieving the above-enumerated objects, and while preferred embodiments of the present invention have been disclosed, it will be appreciated that the present invention is not limited thereto, but may be otherwise embodied within the scope of the following claims.

What is claimed is:

1. A servovalve comprising a housing, a fluid inlet in said housing, a fluid outlet in said housing, a plurality of nozzles in communication with said fluid inlet, a flapper, an armature mounting said flapper in cantilevered fashion and in contiguous relationship to said plurality of nozzles, a gap between said plurality of nozzles and said flapper, said gap having a dimension which is quite small in relation to the diameter of each of said nozzles so that the fluid metering area is the product of the flow periphery which is the sum of the peripheries of each of said nozzles times the dimension of said gap, moving means in said servovalve for moving said armature to effect relative positioning between said plurality of nozzles and said flapper, said armature requiring an actuating force from said moving means to effect relative positioning between said flapper and said plurality of nozzles which is the product of the pressure drop across said gap times the projected area of said plurality of nozzles on said flapper, said plurality of nozzles having a smaller projected area than that of a single cylindrical nozzle of equivalent periphery, whereby said moving means which is used to cause said armature to effect relative movement between said plurality of nozzles and said flapper may produce a smaller force output than that of moving means which is used to effect relative movement between a flapper and said single cylindrical nozzle.

2. A servovalve as set forth in claim 1 including hole means in said flapper for producing a predetermined flow path.

3. A servovalve as set forth in claim 1 wherein said conduit means includes an end wall proximate said flapper and wherein said plurality of nozzles comprise a plurality of tube-like members mounted on said end wall.

4. A servovalve as set forth in claim 1 wherein said conduit means includes an end wall proximate said flapper and wherein said plurality of nozzles comprise bores in said end wall.

5. A servovalve as set forth in claim 1 wherein said plurality of nozzles are cylindrical nozzles.

* * * * *